July 25, 1933.  A. HAGEL  1,919,785
HOLDER FOR COSMETICS
Filed Feb. 15, 1933
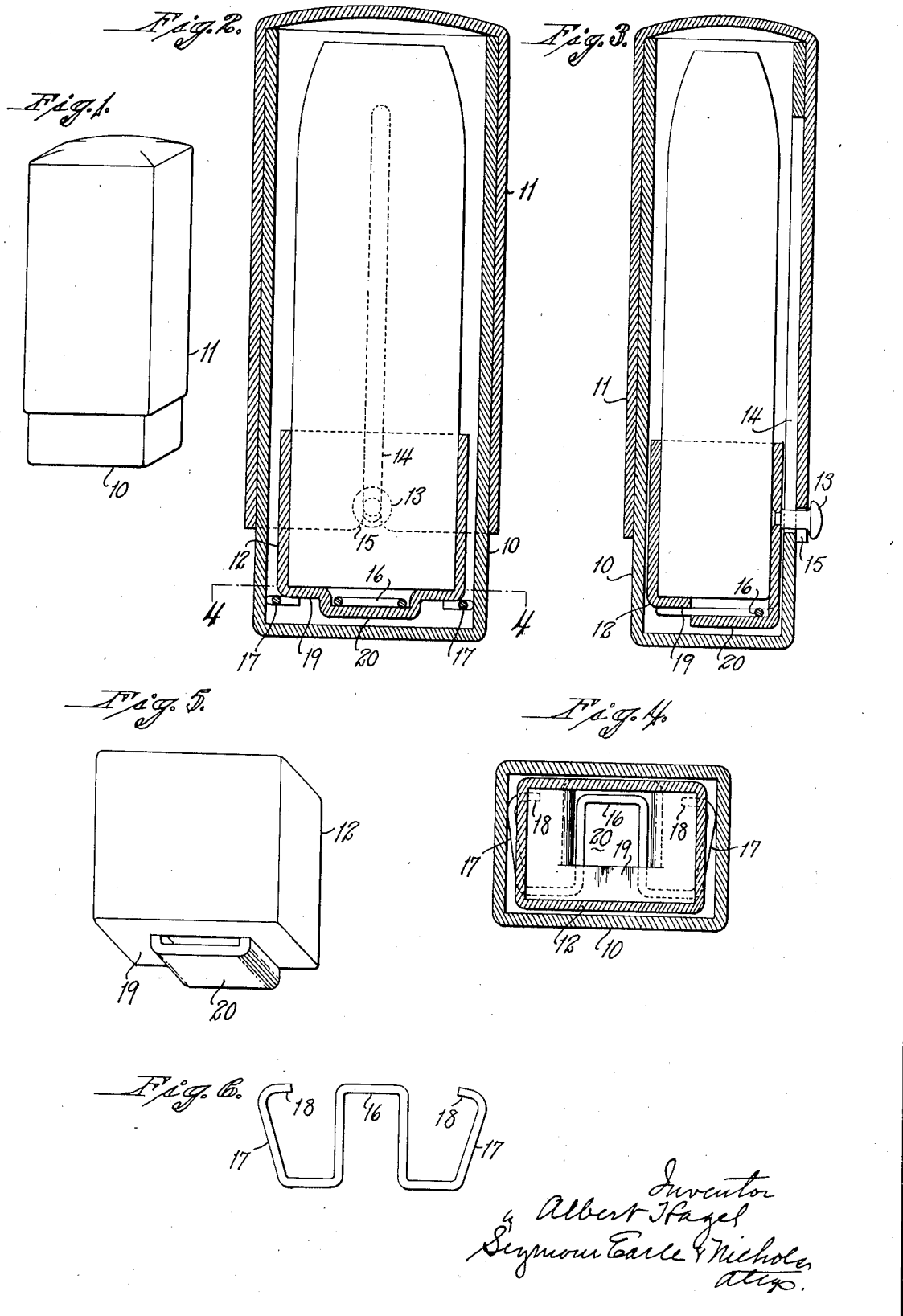

Patented July 25, 1933

1,919,785

UNITED STATES PATENT OFFICE

ALBERT HAGEL, OF NEWARK, NEW JERSEY, ASSIGNOR TO CONSOLIDATED SAFETY PIN COMPANY, OF BLOOMFIELD, NEW JERSEY, A CORPORATION

HOLDER FOR COSMETICS

Application filed February 15, 1933. Serial No. 656,866.

This invention relates to an improvement in holders for cosmetics, and particularly lipstick holders, the object being to provide means for projecting a lipstick from a holder and providing means so that the stick will remain in its projected position without being so held by the fingers.

The invention consists in the construction as hereinafter described and particularly recited in the claim.

In the accompanying drawing:

Fig. 1 is a perspective view of a holder for cosmetics constructed in accordance with my invention;

Fig. 2 is a vertical sectional view of the same, on an enlarged scale;

Fig. 3 is a sectional view at right angles to Fig. 2;

Fig. 4 is a sectional view on the line 4—4 of Fig. 2;

Fig. 5 is a perspective view of the cosmetic holder, detached; and

Fig. 6 is a plan view of the friction spring, detached.

In carrying out my invention, I employ a tubular casing 10 closed at its inner end, and a cover 11 adapted to close the casing. Within the casing is a cup-shaped lipstick holder 12 and secured to one side thereof is a button 13 which projects outward through a longitudinal slot 14 in the casing, and preferably the lower end of the cover 11 will be formed with a notch 15 to clear the button.

The holder 12 is smaller in dimensions than the inside of the casing, so that it may freely move longitudinally therein, but to hold it in its desired position, a spring is provided and connected with the holder and adapted to bear against the inner walls of the casing. In the preferred form, this spring is formed from a piece of wire forming a centrally-arranged yoke 16 and side arms 17, which terminate in inwardly-extending fingers 18.

A portion of the bottom 19 of the holder is set downward to form a plate 20 upon which the spring may be seated, the arms 17 having a frictional bearing against the inner wall of the casing, so that the holder 12 will be held in any position of adjustment and, hence, when the lipstick is projected to the desired extent, it will remain in that position without being held there by force applied to the button 13.

While I have referred to the use of my invention for a lipstick holder, it will be obvious that it may be applied to holders for various forms of cosmetics.

I claim:

The combination with a casing, of a holder in said casing and longitudinally movable therein, a portion of the bottom wall of the holder offset, forming a plate, and a friction spring comprising a central yoke and side arms, the yoke portion bearing on said plate and the arms adapted to frictionally engage with the side walls of the casing.

ALBERT HAGEL.